UNITED STATES PATENT OFFICE.

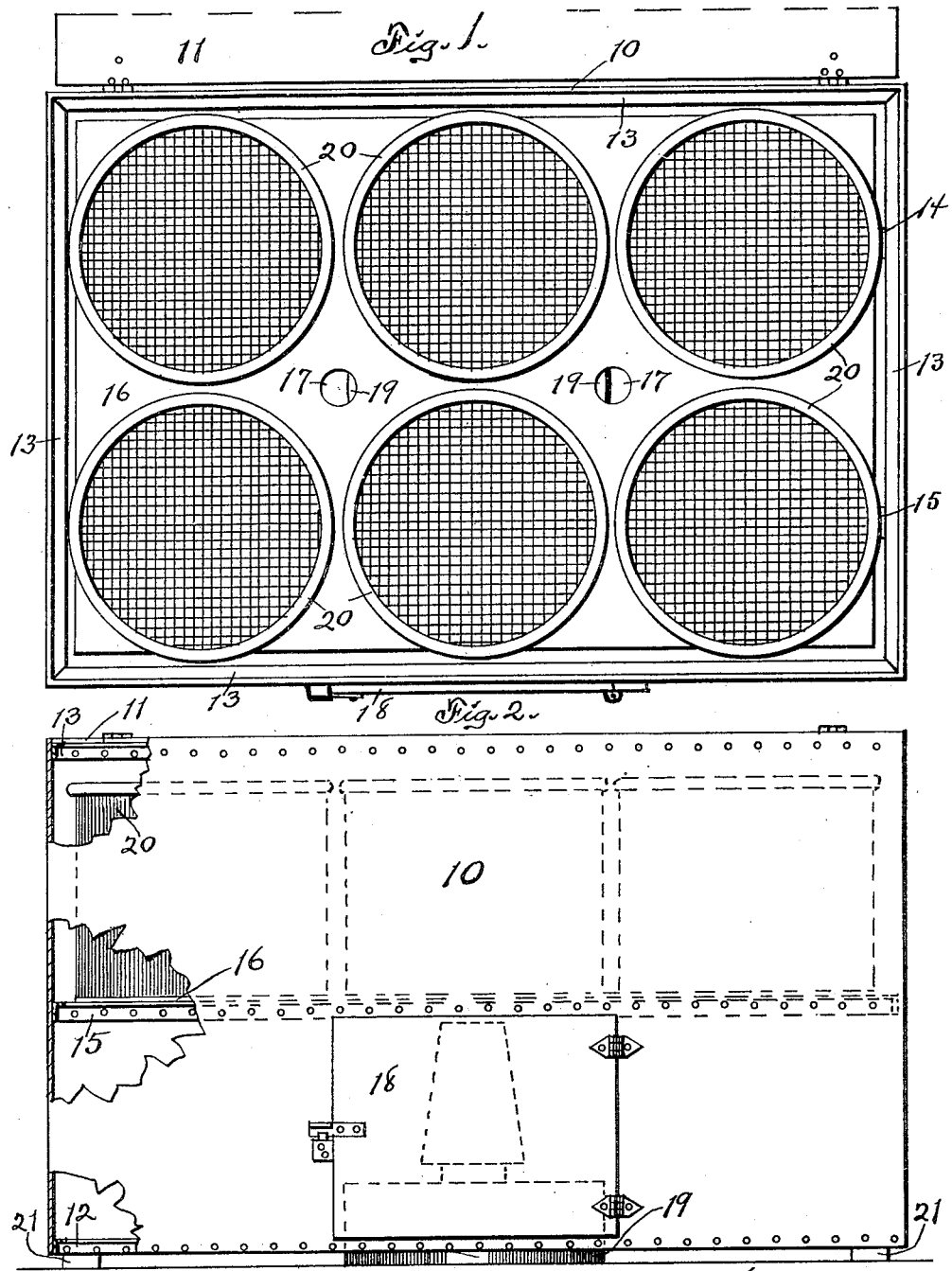

DAVID BENSON, OF LAMOILLE, ILLINOIS.

GRAIN-SPROUTER.

1,130,135.   Specification of Letters Patent.   Patented Mar. 2, 1915.

Application filed October 9, 1913, Serial No. 794,319. Renewed January 18, 1915. Serial No. 2,980.

*To all whom it may concern:*

Be it known that I, DAVID BENSON, a citizen of the United States of America, and resident of Lamoille, Bureau county, Illinois, have invented a new and useful Grain-Sprouter, of which the following is a specification.

The object of this invention is to provide an improved construction for devices adapted to be employed for sprouting grain for domestic use in supplying green food for fowls and animals.

My invention consists in the construction, arrangement and combination of elements hereinafter set forth, pointed out in my claim and illustrated by the accompanying drawing, in which—

Figure 1 is a plan of the device, the cover being shown in open position and broken away to reveal interior construction and to economize space. Fig. 2 is a front elevation of the device, portions of the front wall being broken away to reveal interior construction.

In the construction of the device as shown the numeral 10 designates a casing preferably made of sheet metal and with quadrilateral faces. The casing preferably is open at its bottom at all times and open at its top except when closed by means of a door or cover 11 hinged at one side to the rear wall of the casing and of such size as to be received within the walls of the casing. The cover 11 may be glazed if desired to provide solar light to the sprouting grain within the casing. Rectangular frames 12, 13 formed of angle bars, are mounted within and riveted to the walls of the casing at the bottom and near to the top, respectively, of said walls. The upper frame 13 is placed in a slightly lower plane than the upper margins of the walls of the casing in order that it may support the cover 11 within said walls, the upper surface of said cover preferably being flush with the upper margins of the walls. Bars 14, 15 preferably made of angle-bars, are mounted in spaced relations longitudinally of the casing and approximately midway of the height of said casing, and said bars are secured at their ends to the end walls. A partition or deflector 16 is mounted on and preferably fixed to the bars 14, 15 and is spaced at its margins from the walls of the casing. The deflector also may be provided with apertures 17 in any desired number and in any arrangement. The front wall of the casing 10 is provided with a suitable door 18 and a lamp 19 is arranged within the casing beneath the deflector. The lamp 19 may be of any construction suitable for furnishing heat to warm the interior of the casing, and when of portable character may be passed to and fro through the doorway in the front wall of the casing. Grain receptacles 20, in this instance six in number, may be placed on the deflector 16 or be spaced from said deflector by suitable means such as small blocks or bars loosely arranged. The receptacles 20 may be of any desired construction, but I prefer to use such as are made with cylindrical sheet-metal rims and reticulated or perforated metal bottoms raised slightly relative to the lower margins of the rims.

In practical use the casing preferably is set on blocks or bars 21 to raise it slightly from the floor for the supplying of atmospheric air to the lamp, the lamp is introduced to a position centrally of and beneath the deflector, and one of the receptacles is supplied with grain, such as oats in moistened condition, and set in the center of the deflector. After one day the first receptacle is moved to one side and another receptacle loaded in like manner is placed at or near the center of the deflector. On succeeding days other receptacles are loaded and placed until the space provided is occupied. As it takes about six days properly to sprout the grain for growing of green food, on the seventh day the first-placed receptacle is removed, emptied, reloaded and replaced, and such operation is repeated successively to the end of providing the contents of one receptacle for feeding each day. It is to be understood that the casing and receptacles may be of any desired capacity.

I claim as my invention—

A grain sprouter, comprising a casing having an open bottom and a hinged cover at its top, angle frames within and fixed to the upper and lower portions of the walls of said casing, the upper frame being depressed to receive and support the cover, legs supporting said casing above the floor, a lamp in said casing, bars crossing said casing above said lamp, a perforated plate supported by said bars, said plate being spaced at its margins from the inner walls of the casing, and a plurality of sheet metal receptacles mounted loosely on said plate, said receptacles being formed with reticulated bottoms.

Signed by me at Des Moines, Iowa, this twelfth day of September, 1913.

DAVID BENSON.

Witnesses:
S. C. SWEET,
H. G. SWEET.

Copies of this patent may be obtained for five cents each, by addressing the "Commissioner of Patents, Washington, D. C."